United States Patent [19]

Knoth et al.

[11] Patent Number: 4,473,389
[45] Date of Patent: Sep. 25, 1984

[54] GLASS GOB FEEDING DEVICE

[75] Inventors: Werner-Dieter Knoth; Helmut Hüllen, both of Essen; Klaus Kopatz, Bottrop, all of Fed. Rep. of Germany

[73] Assignee: Veba-Glas AG, Essen, Fed. Rep. of Germany

[21] Appl. No.: 449,007
[22] PCT Filed: Mar. 13, 1982
[86] PCT No.: PCT/EP82/00054
   § 371 Date: Nov. 29, 1982
   § 102(e) Date: Nov. 29, 1982
[87] PCT Pub. No.: WO82/03383
   PCT Pub. Date: Oct. 14, 1982

[30] Foreign Application Priority Data

Apr. 2, 1981 [DE] Fed. Rep. of Germany ....... 3113304

[51] Int. Cl.³ .............................................. C03B 7/12
[52] U.S. Cl. ....................................... 65/332; 65/165; 65/334; 83/600; 83/623
[58] Field of Search .................. 65/324, 332, 334, 164; 83/600, 623

[56] References Cited

U.S. PATENT DOCUMENTS 1,790,987  2/1931  Greer .................................. 65/329
1,828,443  10/1931 Rankin ................................. 65/332
2,077,147  4/1937  Honiss ............................. 65/332 X
2,950,571  8/1960  Wythe .................................. 65/164

FOREIGN PATENT DOCUMENTS 866238  7/1949  Fed. Rep. of Germany.
965265  6/1957  Fed. Rep. of Germany.

Primary Examiner—Robert L. Lindsay, Jr.
Attorney, Agent, or Firm—Karl F. Ross; Herbert Dubno

[57] ABSTRACT

A feeding device has the object to ensure the supply of a continuously flowing glass strand and to divide it into predetermined gobs thus establishing the weight of the individual gob and thereafter to proceed with the final sectioning. It is known to activate the drives of the moving mechanical parts of such a feeding device by compressed air. Because of the compressibility of the air, and depending, among others, on the length of the piping, its clear cross section and the prevailing air pressure, an accurate control is not possible, especially when the masses to be moved are large. In order to avoid these disadvantages, the invention makes use of hydraulic piston units for the drive of the translatory movement of the stopper and of the pipe and the use of a hydraulic rotary piston for the rotational movement of the cutting device. The turning movement of the pipe is achieved through a hydraulic rotary piston.

2 Claims, 1 Drawing Figure

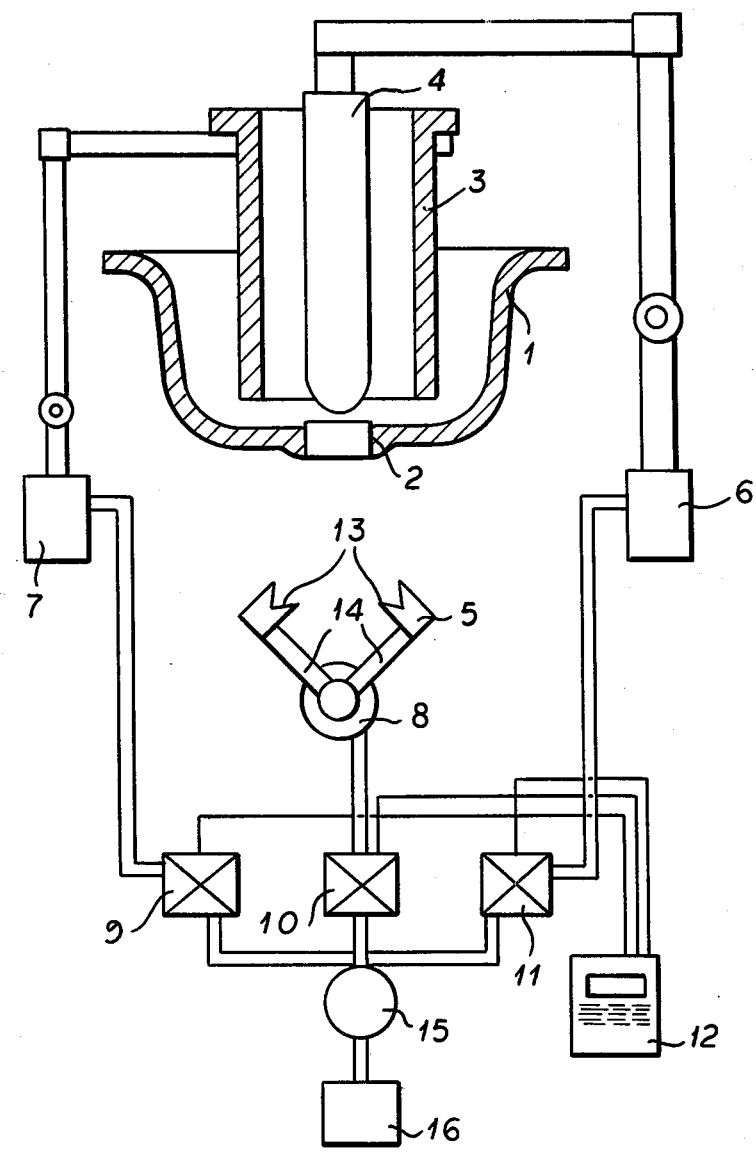

GLASS GOB FEEDING DEVICE

CROSS REFERENCE TO RELATED APPLICATIONS

This application is a national phase application corresponding to PCT/EP 82/00054 filed Mar. 13, 1982 and based upon German application P 31 1334.5 filed Apr. 2, 1981 under the International Convention.

1. Field of the Invention

The invention relates to a feeding device having a dish with a bottom opening to which an up and down moving stopper surrounded by a pipe is attached, a cutting device being provided under the bottom opening of the feeding device.

BACKGROUND OF THE INVENTION

The object of such a feeding device is to ensure the supply of a continuously flowing glass strand and to divide it into predetermined fragments (gobs), thus establishing the weight of the individual fragments and thereafter to proceed with the final sectioning. A coupling, mostly electrical, to the subsequently connected glass forming machine synchronizes the movements of the cutting device with the glass forming machine. It is known to activate the drives of the moving mechanical parts of such a feeding, device by compressed air, this, however, has a number of disadvantages, as discussed below.

If, for instance, a movement is to be generated by expanding compressed air, a delay occurs between the actuation of the air release valves and the beginning of the movement, as in the case of a piston in a cylinder. This is a consequence of the compressibility of the air and depends, among others, on the length of the piping, its clear cross section and the prevailing air pressure. A precise control, especially in the case of rapid switch sequences, becomes more and more difficult particularly when large masses are to be moved.

Another very important disadvantage is that a compressed air cylinder as a drive unit can have only an either/or position. For instance, air pressure applied at one end of the piston of the cylinder and presses it with built-up pressure until the piston reaches the opposite end of travel. The same applies to the return travel. It is not possible to stop the piston in a determined intermediate position, since, due to the compressibility of the air, a change in pressure results in a change in the piston travel.

Other mechanisms of the feeding device are driven by points of thrust, determined by a cam disk. At higher speeds the sensor starts to move away from the cam disk, this disturbs both the driving process and the synchronization.

SUMMARY OF THE INVENTION

In order to avoid these disadvantages, the invention makes use of hydraulic axial piston units for the drive of the translatory movement of the stopper and the pipe and a hydraulic rotary piston for the rotational movement of the cutting device.

The constant turning motion of the pipe can be achieved by means of a hydraulic rotary piston, which, if necessary, can be coupled with the hydraulic axial piston unit.

The hydraulic rotary piston is connected to the cutting elements of the cutting device via gears, excentrics or the like, in such a manner as to produce a shears-like motion of the cutting elements, so that premeasured gobs can be sectioned from the liquid glass strand.

All the hydraulic drives of the feeding device are actuated by switchvalves or the like, these being controlled by a computer and processor. The computer and processor is provided with a timer which controls in a simple manner, through coupling, all the further production elements requiring synchronization, such as the glass forming machine, cooling-oven pusher. In addition, the computer and processor is programmed to control the travel, time, speed, etc., in order to ensure an optimum control of the course of motion of the hydraulic drives. This way, a precise monitoring and control of the moving parts of the feeding device as well as of the other thereto connected machine elements is achieved according to the end position on one hand and to the intermediate position, on the other.

BRIEF DESCRIPTION OF THE DRAWING

The sole FIGURE of the drawing is a schematic view of a feeding device having a cutting device underneath according to the invention.

SPECIFIC DESCRIPTION

The dish of the feeding device has a bottom opening 2 with which an up-and-down-moving stopper 4 cooperates, this stopper being spacedly surrounded by a ceramic pipe 3. The flow of the glass in dish 1 is regulated by the ceramic pipe 3 and the stopper 4, so that the glass strand, not further shown in the drawing, after leaving the bottom opening 2, is sectioned into individual gobs by the cutting device 5. The translatory vertical stroke of the stopper 4 is achieved by means of a hydraulic axial piston unit 6. The translatory rising motion of the generally rotatable pipe 3 is acheived by the axial piston unit 7. The cutting device 5 performing a rotation angular movement, is actuated by a hydraulic rotary piston 8. The rotary hydraulic piston 8 can actuate both cutting elements 13 of the cutting device 5 directly through a hydraulic rotary shaft.

In addition, by use of gears a motion is created, according to which the arms 14 of the cutting device 5 move either toward each other, or away from each other.

The hydraulic drives 6, 7, 8 are actuated through the corresponding switch valves 9, 10, 11 by oil pressure. These switch-valves 9, 10, 11, in turn, are activated by impulses from the electronic computer and processor 12.

A pump 15 and a collecting tank 16 are also part of the hydraulic drive.

Especially the electronically processor-controlled hydraulic drive installation has the capability to take care of the physical and chemical constants of the glass in the storage device itself. For this purpose electric transmitters are installed for instance for temperature, viscosity and other indicators. By means of a analog-digital transducer the computer and process 10 receives the data referring to the physical and chemical constants, which, if necessary can determine a correction of the hydraulic drives 6, 7, 8.

We claim:

1. A gob-portioning device for a glass forming machine comprising:
    a dish for receiving molten glass and having a hole at the bottom for discharging a strand thereof;

a stopper vertically displaceable in said dish and positioned above said hole;

a pipe spacedly surrounding said stopper and vertically shiftable in said disc;

a first hydraulically actuatable axial piston unit operatively connected to said stopper for vertically displacing same;

a second hydraulic axial piston unit operatively connected to said pipe for vertically displacing same;

at least one cutting element disposed below said dish and rotatable to cut said gob;

a hydraulic rotary piston unit operatively connected to said cutting element for actuating same;

a hydraulic pump common to all of said units;

respective electrically controlled hydraulic valves between said pump and each of said units for selective energization to control the production of a gob of glass; and a computer-processor connected to said valves for controlling the actuation thereof in response to physical and chemical constants of the glass fed to said dish.

2. The device defined in claim 1 wherein said pipe is rotatable.

* * * * *